United States Patent
Zehnder et al.

(10) Patent No.: US 9,120,368 B2
(45) Date of Patent: Sep. 1, 2015

(54) ARTICULATED DEVICE BETWEEN LINKAGE ASSEMBLY SUPPORT ARMS OF A COLLAPSIBLE ROOF

(75) Inventors: Frank Zehnder, Hemmingen (DE); Markus Sczuka, Stuttgart (DE); Michael Wohlfarth, Waldsee (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 1050 days.

(21) Appl. No.: 12/824,388

(22) Filed: Jun. 28, 2010

(65) Prior Publication Data

US 2011/0002730 A1 Jan. 6, 2011

(30) Foreign Application Priority Data

Jun. 30, 2009 (DE) .......................... 10 2009 031 050

(51) Int. Cl.
| | |
|---|---|
| *F16C 11/04* | (2006.01) |
| *B60J 7/12* | (2006.01) |
| *F16C 33/08* | (2006.01) |
| *F16C 17/10* | (2006.01) |

(52) U.S. Cl.
CPC .............. *B60J 7/1226* (2013.01); *F16C 11/04* (2013.01); *F16C 33/08* (2013.01); *F16C 17/10* (2013.01); *Y10T 403/19* (2015.01); *Y10T 403/32951* (2015.01); *Y10T 403/32959* (2015.01); *Y10T 403/7058* (2015.01)

(58) Field of Classification Search
CPC ..................... Y10T 403/19; Y10T 403/32951; Y10T 403/32959; Y10T 403/7058; F16C 11/04; B60J 7/1226
USPC .................. 403/26, 161–165, 240, 242, 243, 403/365–369, 371; 384/275, 296
See application file for complete search history.

(56) References Cited

U.S. PATENT DOCUMENTS

| | | | | |
|---|---|---|---|---|
| 2,650,845 | A | * | 9/1953 | Dalley .......................... 403/162 |
| 2,964,341 | A | * | 12/1960 | Doyle et al. .................. 403/162 |
| 3,188,679 | A | * | 6/1965 | Wubbe .......................... 403/161 |
| 3,328,072 | A | | 6/1967 | Adamski |
| 4,441,835 | A | * | 4/1984 | Davis ............................ 403/162 |
| 4,889,458 | A | * | 12/1989 | Taylor .......................... 403/156 |
| 6,102,610 | A | * | 8/2000 | Palusis et al. ................. 403/388 |
| 6,322,132 | B1 | | 11/2001 | Hasselgruber |
| 7,699,394 | B2 | * | 4/2010 | Humer et al. ............ 297/216.12 |
| 2009/0110338 | A1 | * | 4/2009 | Blase et al. .................... 384/296 |

FOREIGN PATENT DOCUMENTS

| | | |
|---|---|---|
| DE | 29516619 U1 | 2/1996 |
| DE | 19941087 A1 | 3/2001 |

* cited by examiner

*Primary Examiner* — Daniel P Stodola
*Assistant Examiner* — Matthew R McMahon
(74) *Attorney, Agent, or Firm* — Brooks Kushman P.C.

(57) ABSTRACT

An articulated device includes a rivet assembly for connecting first and second linkage assembly support arms together at common ends thereof such that the arms are movable relative to one another. The rivet assembly includes a rivet having first and second rivet heads and a rivet shaft. The rivet shaft extends through first and second bearing holes in the common ends of the arms with the first rivet head being on the first arm and the second rivet head being on the second arm. The rivet assembly has a bearing sleeve extending between the rivet shaft and the bearing holes. The bearing sleeve has a collar-type stop and a shoulder-type stop adjacent the first rivet head with the collar-type stop lying against the first arm and the shoulder-type stop lying against the first rivet head. The bearing sleeve has a ring-shaped stop lying against the second rivet head.

9 Claims, 6 Drawing Sheets

ARTICULATED DEVICE BETWEEN LINKAGE ASSEMBLY SUPPORT ARMS OF A COLLAPSIBLE ROOF

CROSS-REFERENCE TO RELATED APPLICATIONS

This application claims foreign priority benefits under 35 U.S.C. §119(a)-(d) to DE 10 2009 031 050.9, filed Jun. 30, 2009, which is hereby incorporated by reference in its entirety.

BACKGROUND OF THE INVENTION

1. Field of the Invention

The present invention relates to an articulated device between linkage assembly support arms of a collapsible vehicle roof.

2. Background Art

DE 199 41 087 C2 (corresponds to U.S. Pat. No. 6,322, 132) describes an articulated connection (e.g., hinged joint) for a movable vehicle roof. The hinged joint includes two bearing sections held together by a bearing pin (i.e., a pivot pin, a rivet, etc.). Each bearing section is respectively part of an end section of a corresponding roof bow. The hinged joint permits a relative rotation between the roof bows to enable the roof to be moved between closed and opened positions. One or more of the components of the hinged joint has a friction-reducing surface coating.

DE 295 16 619 U1 describes a hinged joint between two linkage assembly support arms of a movable vehicle roof. The hinged joint includes a bearing pin inserted through aligned holes in the end sections of the arms. The pin is in the hole of the first arm so that it cannot be rotated while the second arm is rotatable with respect to the pin. The pin has a surrounding bushing inserted into a hole of a metallic bearing having a collar. The collar acts as a spacer disk between the arms.

U.S. Pat. No. 3,328,072 describes a convertible top rail for a movable vehicle roof. The top rail includes a control arm, a top bow, and a support arm which are assembled on a common bearing. The support arm has two adjacent support arm elements transversely separated at a distance from one another. The control arm is integrated between the support arm elements with a bearing section. A rivet connects the control arm, the top bow, and the support arm. A bushing made of a pliable material is inserted into the holes of the control arm on which two spacer collars are provided. The spacer collars produce a defined spacing between the control arm and the support arm elements.

SUMMARY OF THE INVENTION

An object of the present invention includes an articulated device (i.e., an articulated connection, a hinged joint, etc.) between linkage assembly support arms of a collapsible vehicle roof in which the articulated device provides a secure connection and has a smooth operation, a relatively simple assembly, and a relatively high force absorption capability.

In carrying out the above object and other objects, the present invention provides an articulated device including a first arm having a first end with a first bearing hole and a second arm having a first end with a second bearing hole with the first ends of the arms being adjacent to one another with the bearing holes being aligned. The articulated device further has a rivet assembly for connecting the arms together at the first ends such that the arms are movable relative to one another about the first ends. The rivet assembly has a rivet. The rivet has first and second rivet heads and a rivet shaft extending between the rivet heads. The rivet shaft extends through the first and second bearing holes with the first rivet head being on the first end of the first arm adjacent to the first bearing hole and the second rivet head being on the first end of the second arm adjacent to the second bearing hole. The rivet assembly further has a bearing sleeve extending between the rivet shaft and the first and second bearing holes. The bearing sleeve have a collar-type stop and a shoulder-type shaft stop adjacent the first rivet head with the collar-type stop lying against the first arm and the shoulder-type shaft stop lying against the first rivet head. The bearing sleeve further has a ring-shaped stop adjacent the second rivet head with the ring-shaped stop lying against the second rivet head.

Further, in carrying out the above object and other objects, the present invention provides an articulated device including a first arm having a first end with a first bearing hole and a second arm having a first end with a second bearing hole with the first ends of the arms being adjacent to one another with the bearing holes being aligned. The articulated device further has a rivet assembly for connecting the arms together at the first ends such that the arms are movable relative to one another about the first ends. The rivet assembly has a blind rivet. The blind rivet has a rivet sleeve and a mandrel shaft with a mandrel head. The rivet sleeve and the mandrel shaft extend through the first and second bearing holes with the mandrel head being on the first end of the first arm adjacent to the first bearing hole. The rivet sleeve has a rivet sleeve head on the first end of the second arm adjacent to the second bearing hole. The rivet assembly further has a bearing sleeve extending between the rivet sleeve and the first and second bearing holes. The bearing sleeve has a collar-type stop and a shoulder-type shaft stop with the collar-type stop lying against the first arm and the shoulder-type shaft stop lying against the mandrel head. The bearing sleeve further has a ring-shaped stop adjacent the rivet sleeve head.

In embodiments of the present invention, an articulated device (i.e., an articulated connection, a hinged joint) including a rivet assembly enables a pair of support arms of a collapsible roof linkage assembly to move relative to one another about a common end in an exemplary manner, i.e., without rattling, due to the design of the rivet assembly. The articulated device has high force absorption capability and long lifetime as well as simple structural implementation. Use of a blind rivet for the rivet connection contributes to simple assembly and controlled formation of the expansion as the shaft is impacted. First and second bearing bushings in first and second bearing holes of the ends of the arms assist the smooth operation of the articulated device and are inexpensive components.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Figure 1:
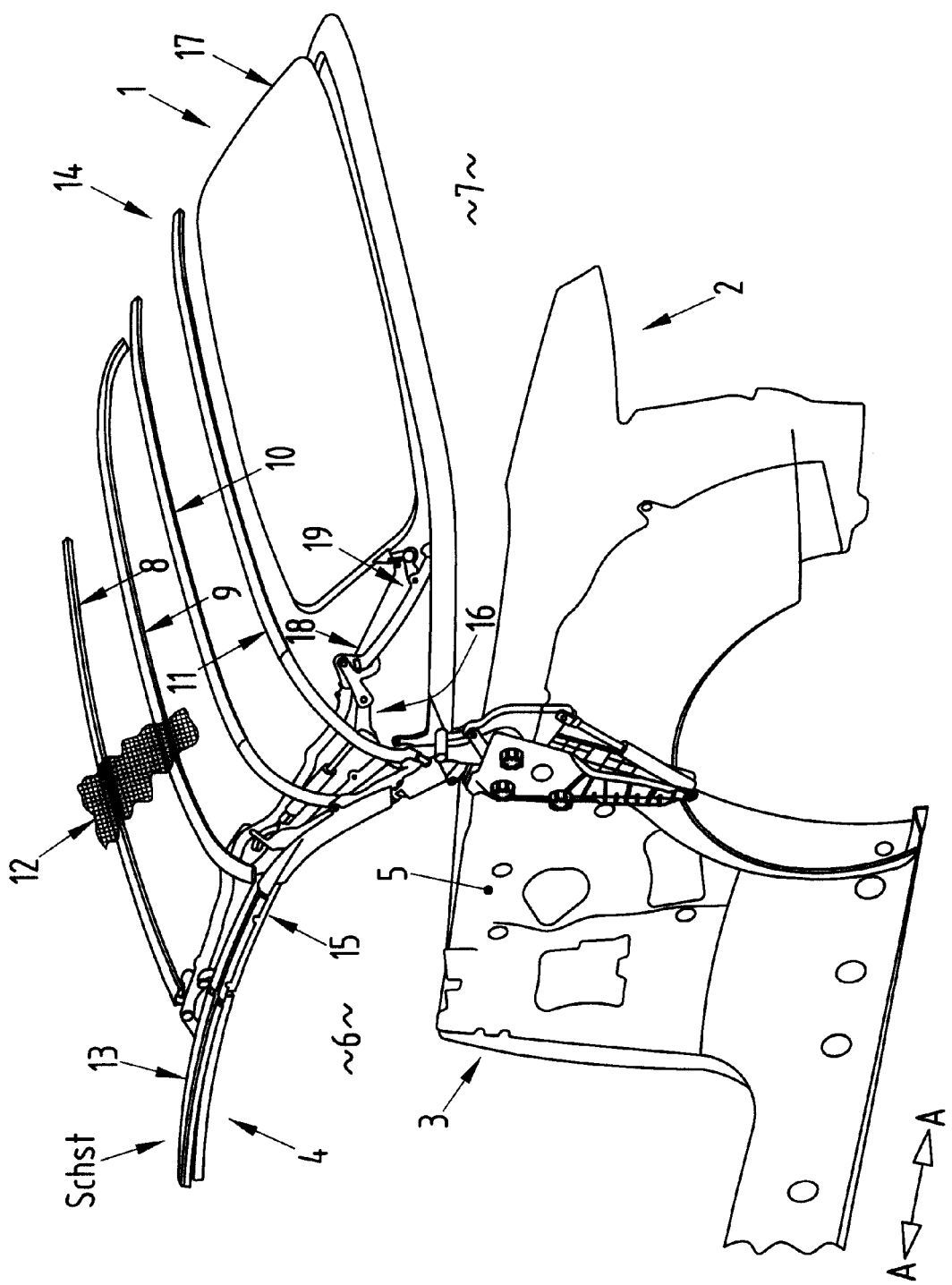
FIG. 1 illustrates an oblique rear view of a passenger vehicle having a movable roof in accordance with an embodiment of the present invention.

Referring now to FIG. 1, an oblique rear view of a passenger vehicle 1 having a movable roof 4 (i.e., a folding top, a convertible top, a collapsible top, etc.) in accordance with an embodiment of the present invention is shown. Vehicle 1 has a vehicle body 2 with a vehicle frame 3. Vehicle frame 3 has a wall structure, e.g., sheet metal, and supports folding top 4 on vehicle body 2. The middle portion of vehicle body 2 includes a passenger compartment and the rear portion of vehicle body 2 includes a luggage compartment 7.

Roof 4 includes a cloth cover 12 stretched over a frame assembly. The frame assembly is pivotably attached on opposite longitudinal sides of a rear portion of vehicle body 2 to move roof 4 between a closed position (designated in FIG. 1 with the reference term "Schst") and an opened position relative to vehicle body 2. In the closed position (shown in FIG. 1), roof 4 spans over and covers passenger compartment 6. In the opened position, roof 4 is rearwardly lowered into luggage compartment 7 and stored therein.

The frame assembly includes a plurality of convertible top bows 8, 9, 10, and 11 which support cloth cover 12 thereon. Top bows 8, 9, 10, and 11 extend between longitudinal sides of vehicle body 2 and run transverse to longitudinal direction A-A of vehicle 1 at a distance from one another along longitudinal direction A-A. As viewed in the direction for forward travel of vehicle 1, top bow 8 lies furthest forward and top bow 11 lies furthest rearward. Top bow 11 forms a boundary of an upper edge of a rear window 17 integrated into the rear region of cover 12.

The frame assembly further includes a first linkage assembly 16 and a second linkage assembly on respective longitudinal sides of vehicle body 2. First linkage assembly 16 includes a first support arm system 15 and the second linkage assembly includes a second support arm system 14. Support arm systems 14 and 15 extend along respective longitudinal sides of vehicle body 2 in vehicle longitudinal direction A-A. Top bows 8, 9, 10, and 11 interact with support arm systems 14 and 15. In particular, one end of each top bow 8, 9, 10, and 11 is connected to first support arm system 15 and opposite end of each top bow 8, 9, 10, and 11 is connected to second arm system 14.

First linkage assembly 16 and the second linkage assembly have the same structure. As such, in the interest of brevity, only first linkage assembly 16 will be described in greater detail. First linkage assembly 16 includes a first articulated device 18 (i.e., a hinged joint, an articulated connection) and a second articulated device 19.

Figure 2:
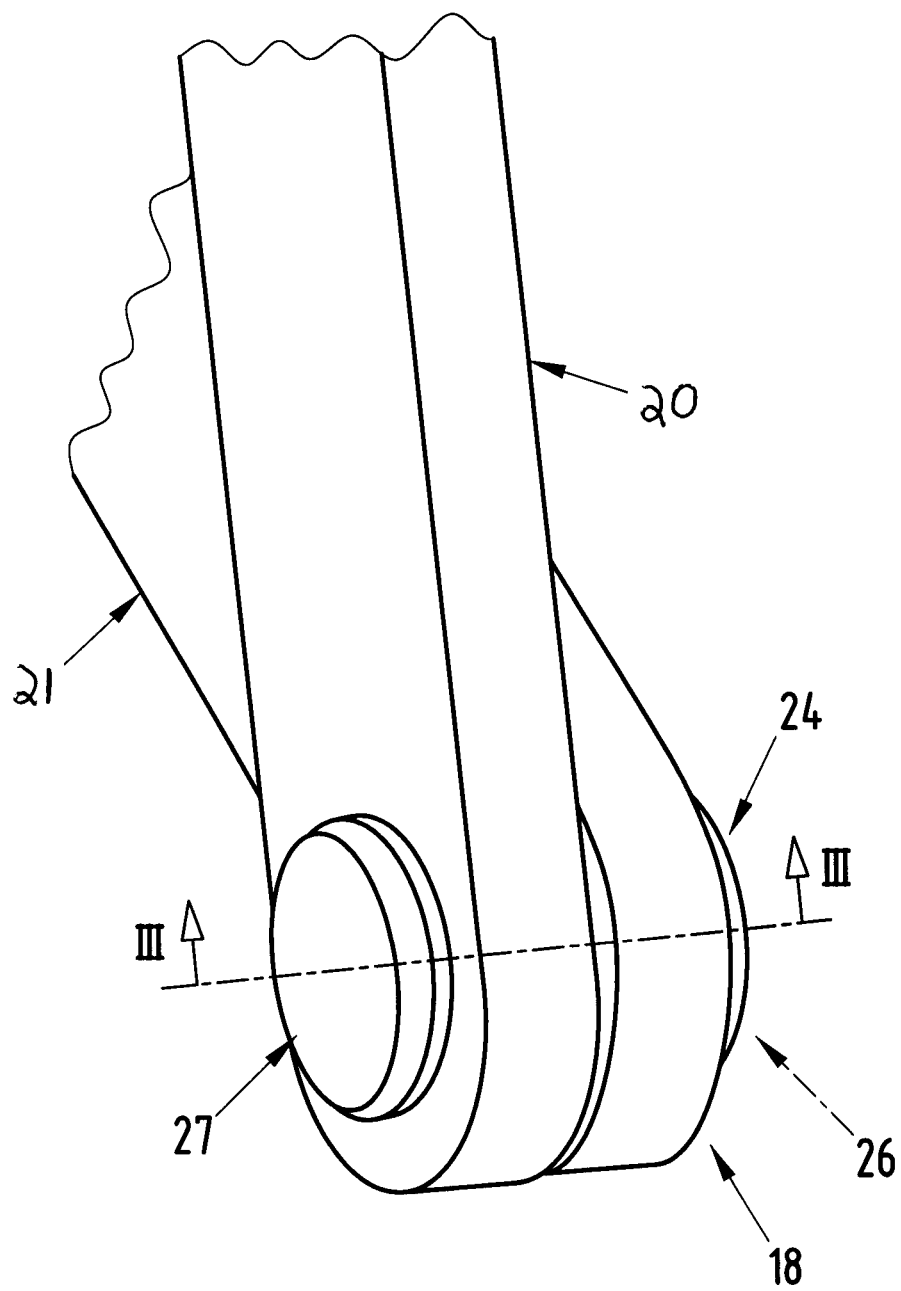
FIG. 2 illustrates a perspective view of a first articulated device for linkage assembly support arms of the roof.

With reference to FIG. 2, first articulated device 18 includes a first support arm 20, a second support arm 21, and riveting assembly 24. Support arms 20 and 21 are part of first support arm system 15. Support arms 20 and 21 are held together at one end by riveting assembly 24 such that support arms 20 and 21 are movable relative to one another about the one end.

Figure 4:
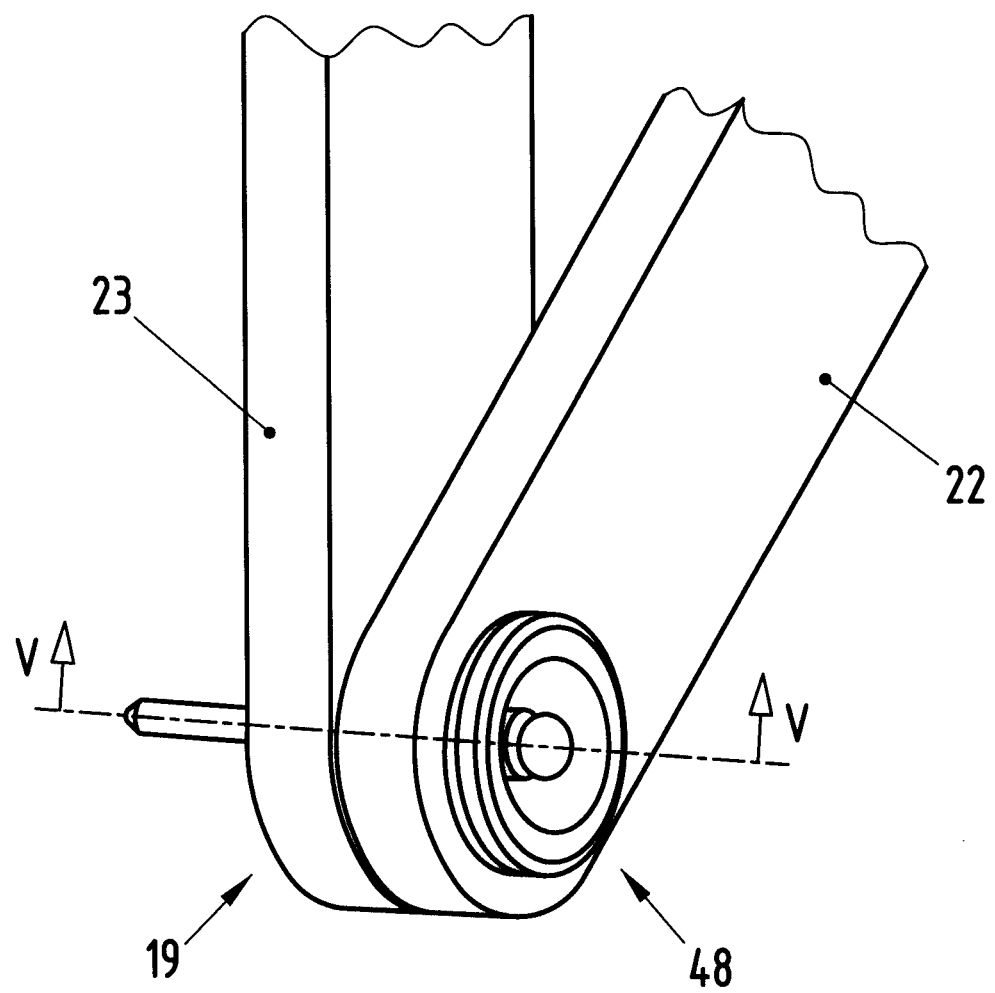
FIG. 4 illustrates a perspective view of a second articulated device for linkage assembly support arms of the roof.

With reference to FIG. 4, second articulated device 19 similarly includes a first support arm 22, a second support arm 23, and riveting assembly 48. Support arms 22 and 23 are part of second support arm system 14. Support arms 22 and 23 are held together at one end by riveting assembly 48 such that support arms 22 and 23 are movable relative to one another about the one end.

Figure 3:
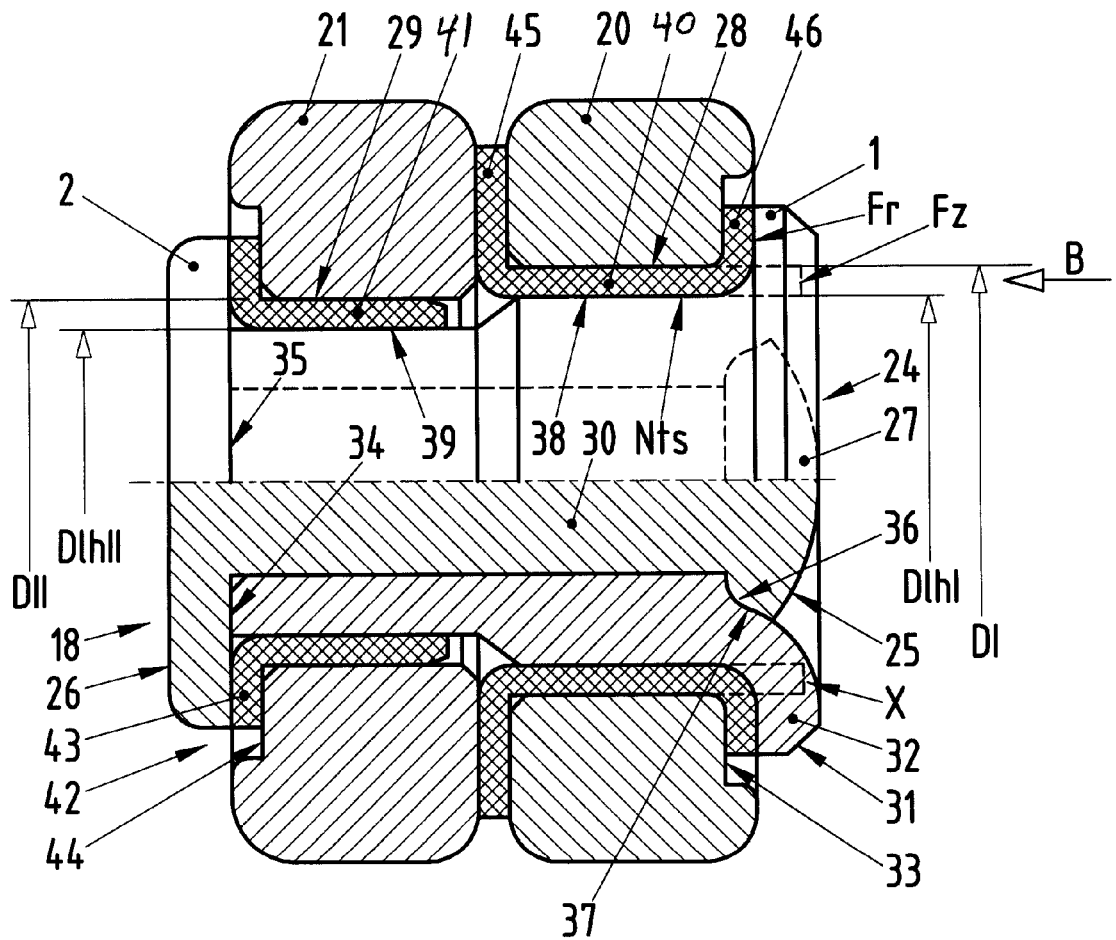
FIG. 3 illustrates an enlarged sectional view of the first articulated device along line III-III of FIG. 2.

Referring now to FIG. 3, with continual reference to FIG. 2, first articulated device 18 will be described in greater detail. As noted above, first and second support arms 20 and 21 of first articulated device 18 are held together at one end by riveting assembly 24 such that support arms 20 and 21 are movable relative to one another about the one end. The one end of first support arm 20 includes a first bearing hole 28 and the one end of second support arm 21 includes a second bearing hole 29. Riveting assembly 24 includes a rivet 25. Rivet 25 has a first rivet head 27 and a second rivet head 26 with a rivet shaft 30 extending therebetween. Rivet shaft 30 extends through bearing holes 28 and 29 of support arms 20 and 21 with first rivet head 27 being on the side of first support arm 20 and second rivet head 26 being on the side of second support arm 21.

Riveting assembly 24 further includes a bearing sleeve 31. Bearing sleeve 31 is between rivet shaft 30 and first and second bearing holes 28 and 29. Bearing sleeve 31 includes a first collar-type stop 32, a second circular ring shaped stop 34, and a third shoulder-type shaft stop 37. Bearing sleeve 31 fits with first collar-type stop 32 to a front face 33 of first support arm 20. Shoulder-type shaft stop 37 of bearing sleeve 31 is in contact directly with an inner side 36 of first rivet head 27. Second circular ring shaped stop 34, which is offset opposite from first stop 32, is supported on an inner side 35 of second rivet head 26. Bearing sleeve 31 further includes first and second bearing sleeve sections 38 and 39 which respectively correspond to first and second bearing holes 28 and 29 of support arms 20 and 21.

Bearing holes 28 and 29 of support arms 20 and 21 have respective different diameters DI and DII. In this embodiment, DI is larger than DII. Like bearing holes 28 and 29, bearing sleeve sections 38 and 39 of bearing sleeve 31 for a rivet sleeve Nts have respective different diameters Dlhl and Dlhll. In this embodiment, Dlhl is larger than Dlhll.

Riveting assembly 24 further includes first and second bearing bushings 40 and 41. First and second bearing bushings 40 and 41 respectively correspond to first and second bearing holes 28 and 29 of support arms 20 and 21. First bearing bushing 40 is between first bearing sleeve section 38 and first support arm 20 within first bearing hole 28. First bearing bushing 40 has a first radial collar 45 and a second radial collar 46. First radial collar 45 of first bearing bushing 40 extends between first and second support arms 20 and 21. Second radial collar 46 of first bearing bushing 40 separates first collar-type stop 32 of bearing sleeve 31 and front face 33 of first support arm 20. Second bearing bushing 41 is between second bearing sleeve section 39 and second support arm 21 within second bearing hole 29. Second bearing bushing 41 has a radial collar 43 on a free end 42 adjacent inner side 35 of second rivet head 26. Radial collar 43 extends between a front face 44 of second support arm 21 and inner side 35 of second rivet head 26.

Figure 7:
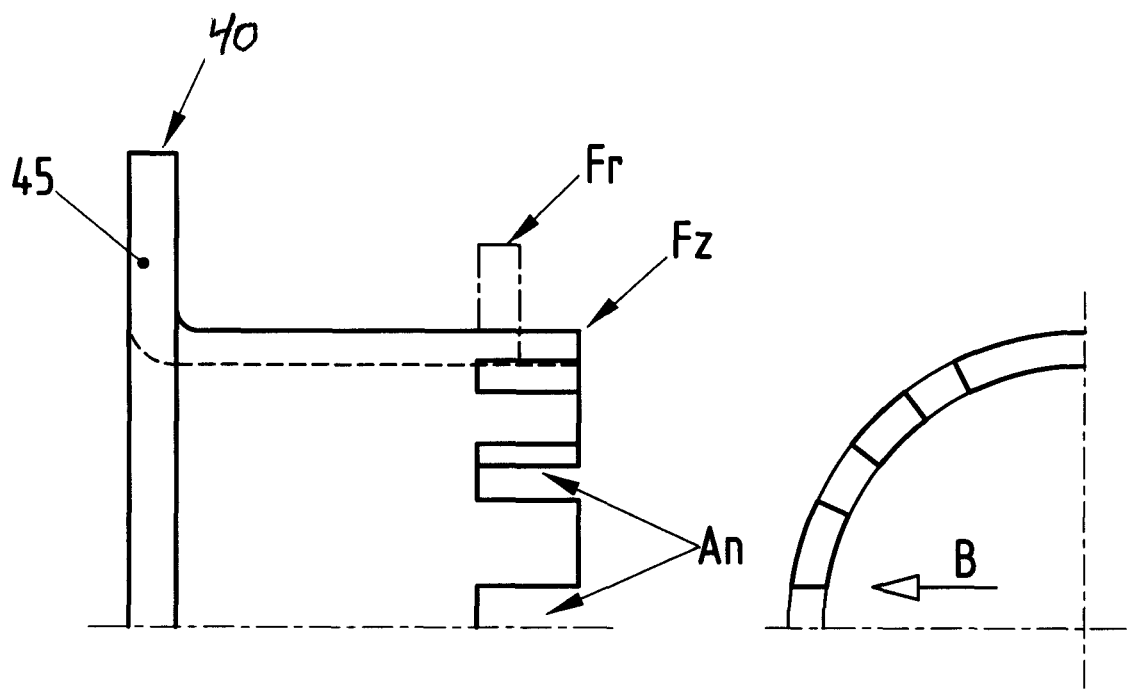
FIG. 7 illustrates each of the first and second articulated devices at detail X of FIGS. 3 and 5.

Second radial collar 46 of first bearing bushing 40 is formed so that it initially has a cylindrical form Fz. Second radial collar 46 is brought into a radial form Fr by axial motion of first collar-type stop 32 of bearing sleeve 31. For this purpose, first bearing bushing 40 in cylindrical form Fz can be provided with local recesses An near its free end as shown in FIG. 7. Local recesses An simplify the deformation of form Fz into form Fr.

Figure 5:
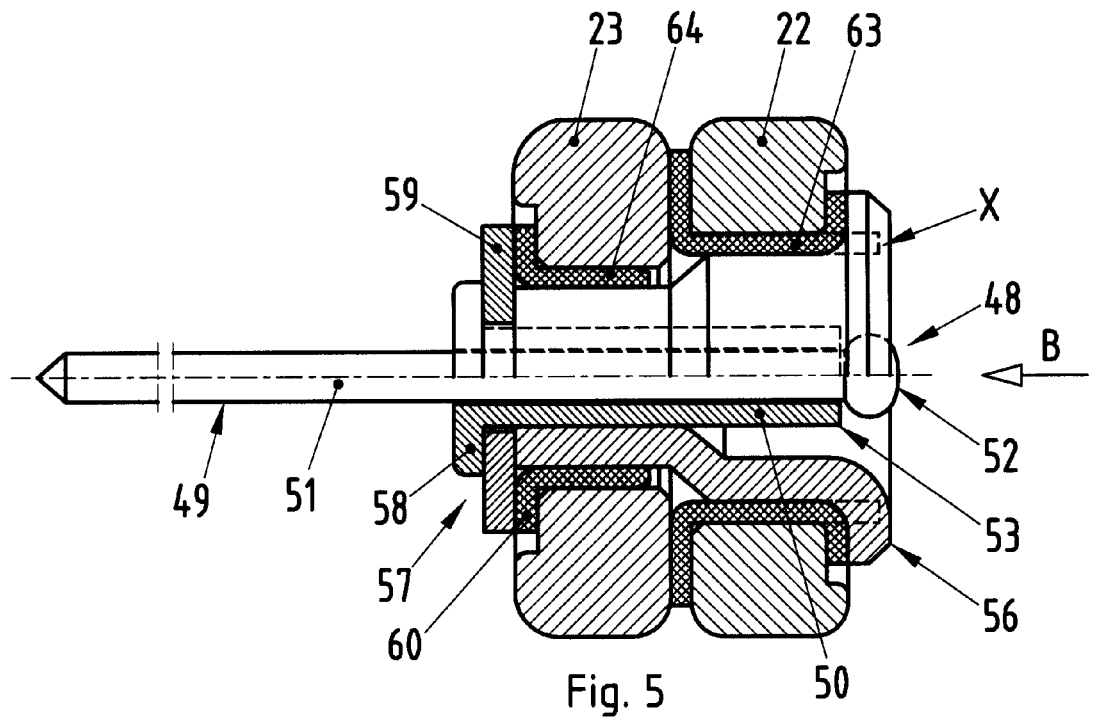
FIG. 5 illustrates an enlarged sectional view of the second articulated device along the line V-V of FIG. 4 during an initial assembly stage.
Figure 6:
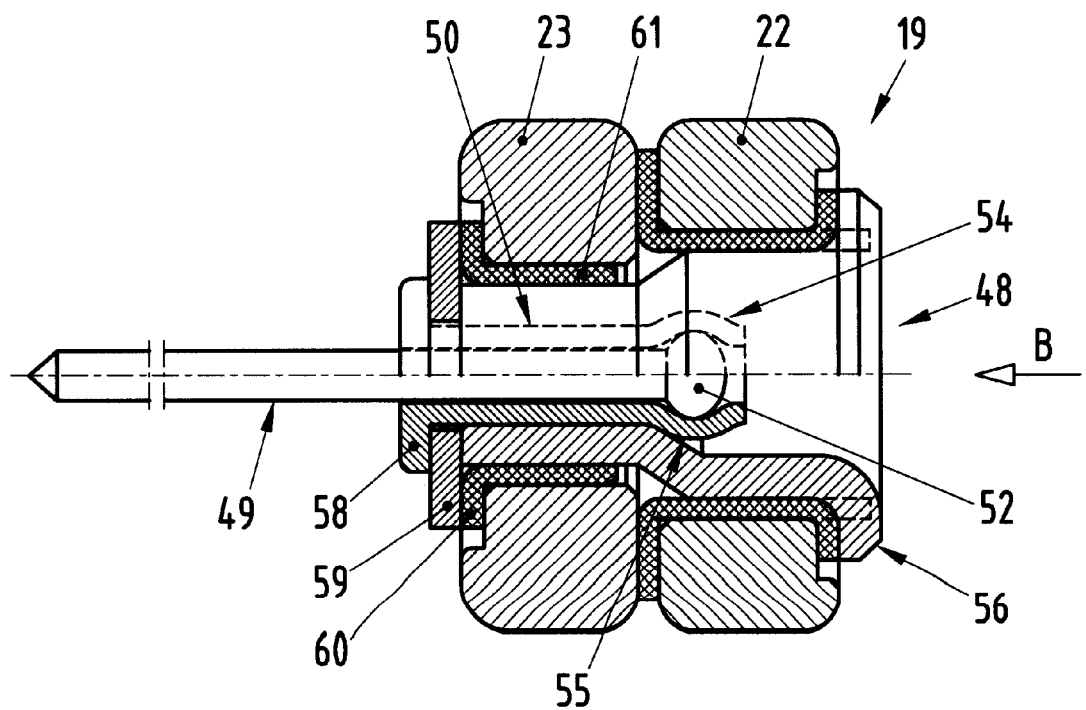
FIG. 6 illustrates an enlarged sectional view of the second articulated device along the line V-V of FIG. 4 during a subsequent assembly stage.

Referring now to FIGS. 5 and 6, with continual reference to FIG. 4, second articulated device 19 will be described in greater detail. As noted above, first and second support arms 22 and 23 of second articulated device 19 are held together at one end by riveting assembly 48 such that support arms 22 and 23 are movable relative to one another about the one end. The one end of first support arm 22 includes a first bearing hole 63 and the one end of second support arm 23 includes a second bearing hole 64.

Riveting assembly 48 has a blind rivet 49. Rivet 49 includes a rivet shaft formed as a rivet sleeve 50 and a mandrel shaft 51 with a mandrel head 52. Rivet sleeve 50 and mandrel shaft 51 extend through bearing holes 63 and 64 of support arms 22 and 23. Mandrel head 52 is on the side of first support arm 22. Rivet sleeve 50 has a rivet sleeve head 58 on a free side 57 corresponding to the side of second support arm 23. Rivet sleeve head 58 is on the side of second support arm 23.

Riveting assembly 48 further includes a bearing sleeve 56. Bearing sleeve 56 has a shaft stop 55. Bearing sleeve 56 is assembled similar to bearing sleeve 31.

Riveting assembly 48 further includes first and second bearing bushings which respectively correspond to first and second bearing holes 63 and 64 of support arms 22 and 23. The first and second bearing bushings of riveting assembly 48 are respectively assembled similar to first and second bearing bushings 40 and 41 of riveting assembly 24. The first bearing bushing corresponding to first bearing hole 63 proceeds between first bearing hole 63 and a first bearing sleeve section of bearing sleeve 56. Likewise, the second bearing bushing corresponding to second bearing hole 64 proceeds between second bearing hole 64 and a second bearing sleeve section of bearing sleeve 56. The bearing bushings of riveting assembly 48 as well as bearing bushings 40 and 41 are made of plastic, metal, or a suitable material having appropriate bearing characteristics.

As shown in FIG. 5, in a pre-finished state, mandrel head 52 lies against a free sleeve end 53 of rivet sleeve 50 on the side of first support arm 22. As shown in FIG. 6, in a finished state, a radial expansion 54 of rivet sleeve 50 lies against shaft stop 55 of bearing sleeve 56. Radial expansion 54 is produced in response to an axial motion of mandrel shaft 51 and mandrel head 52 in the B direction (i.e., from the side of first support arm 22 to the side of second support arm 23). Rivet sleeve 50 by interposition of a spacer disk 59 lies against a collar 60 of a bearing bushing corresponding to second bearing hole 63.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An articulated device comprising:
   a first arm having a first end with a first bearing hole;
   a second arm having a first end with a second bearing hole, wherein the first ends of the arms are adjacent to one another with the bearing holes axially aligned; and
   a rivet assembly for connecting the arms together at the first ends such that the arms are movable relative to one another about the first ends, the rivet assembly having a rivet, the rivet having first and second rivet heads and a rivet shaft axially extending between the rivet heads, the rivet shaft axially extending through the first and second bearing holes with the first rivet head being adjacent to the first end of the first arm adjacent to the first bearing hole and the second rivet head being on the first end of the second arm adjacent to the second bearing hole, wherein the first rivet head partially covers the first bearing hole and the second rivet head entirely covers the second bearing hole;
   the rivet assembly further having a bearing sleeve axially extending along the rivet shaft and radially extending between the rivet shaft and the first and second bearing holes, the bearing sleeve having a first stop and a shaft stop adjacent the first rivet head with the first stop lying against the first arm and the shaft stop lying at least partially axially within the first bearing hole against the first rivet head, wherein the first stop and the first rivet head are radially aligned with one another at an axial position located outside of the first bearing hole, the bearing sleeve further having a ring-shaped stop adjacent the second rivet head with the ring-shaped stop lying axially within the second bearing hole against the second rivet head.

2. The articulated device of claim 1 wherein:
   the first rivet head includes a radial expansion, wherein the shaft stop lies against the radial expansion of the first rivet head.

3. The articulated device of claim 1 wherein:
   the bearing sleeve further includes first and second bearing sleeve sections which respectively correspond to the first and second bearing holes of the arms;
   wherein the rivet assembly further includes first and second bearing bushings which respectively correspond to the first and second bearing holes of the arms;
   wherein the first bearing bushing is between the first bearing sleeve section and the first arm within the first bearing hole and the second bearing bushing is between the second bearing sleeve section and the second arm within the second bearing hole.

4. The articulated device of claim 3 wherein:
   the second bearing bushing has a radial collar, the radial collar extending between the second arm and the second rivet head.

5. The articulated device of claim 3 wherein:
   the first bearing bushing has first and second radial collars, the first radial collar extending between the first and second arms, the second radial collar is between the first stop of the bearing sleeve and the first arm.

6. The articulated device of claim 5 wherein:
   the second radial collar is deformed from a cylindrical form into a radial form in response to an axial motion of the bearing sleeve in the direction from the first rivet head to the second rivet head.

7. The articulated device of claim 6 wherein:
   the second radial collar includes recesses to assist in the deformation of the second radial collar from the cylindrical form to the radial form.

8. The articulated device of claim 3 wherein:
   the bearing bushings include at least one of plastic and metal.

9. The articulated device of claim 1 wherein:
   the first bearing hole has a larger diameter than the second bearing hole.

* * * * *